US007836295B2

United States Patent
Chari et al.

(10) Patent No.: US 7,836,295 B2
(45) Date of Patent: Nov. 16, 2010

(54) METHOD AND APPARATUS FOR IMPROVING THE RESILIENCE OF CONTENT DISTRIBUTION NETWORKS TO DISTRIBUTED DENIAL OF SERVICE ATTACKS

(75) Inventors: Suresh N. Chari, Tarrytown, NY (US); Pau-Chen Cheng, Yorktown Heights, NY (US); Kang-Won Lee, Nanuet, NY (US); Sambit Sahu, Mahopac, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1329 days.

(21) Appl. No.: 10/207,695

(22) Filed: Jul. 29, 2002

(65) Prior Publication Data

US 2004/0019781 A1 Jan. 29, 2004

(51) Int. Cl.
*H04L 12/66* (2006.01)
(52) U.S. Cl. .................. 713/154; 726/13; 711/216; 711/220; 711/221; 707/698; 707/747
(58) Field of Classification Search ............... None
See application file for complete search history.

(56) References Cited

U.S. PATENT DOCUMENTS

| | | | | |
|---|---|---|---|---|
| 5,274,631 A | * | 12/1993 | Bhardwaj | 370/401 |
| 5,757,795 A | * | 5/1998 | Schnell | 370/392 |
| 5,951,649 A | * | 9/1999 | Dobbins et al. | 709/238 |
| 6,006,259 A | * | 12/1999 | Adelman et al. | 709/223 |
| 6,006,264 A | * | 12/1999 | Colby et al. | 709/226 |
| 6,061,798 A | | 5/2000 | Coley et al. | 713/201 |

(Continued)

FOREIGN PATENT DOCUMENTS

JP 11122288 4/1994

(Continued)

OTHER PUBLICATIONS

Andrew Tanenbaum. "Computer Networks." 1996. Prentice Hall PTR. pp. 460-474.*

(Continued)

*Primary Examiner*—Emmanuel L Moise
*Assistant Examiner*—Tamara Teslovich
(74) *Attorney, Agent, or Firm*—F. Chau & Associates, LLC

(57) ABSTRACT

Several deterrence mechanisms suitable for content distribution networks (CDN) are provided. These include a hash-based request routing scheme and a site allocation scheme. The hash-based request routing scheme provides a way to distinguish legitimate requests from bogus requests. Using this mechanism, an attacker is required to generate $O(n^2)$ amount of traffic to victimize a CDN-hosted site when the site content is served from n CDN caches. Without these modifications, the attacker must generate only $O(n)$ traffic to bring down the site. The site allocation scheme provides sufficient isolation among CDN-hosted Web sites to prevent an attack on one Web site from making other sites unavailable. Using an allocation strategy based on binary codes, it can be guaranteed that a successful attack on any individual Web site that disables its assigned servers, does not also bring down other Web sites hosted by the CDN.

13 Claims, 2 Drawing Sheets

U.S. PATENT DOCUMENTS

| | | | |
|---|---|---|---|
| 6,101,543 A * | 8/2000 | Alden et al. | 709/229 |
| 6,175,874 B1 * | 1/2001 | Imai et al. | 709/238 |
| 6,289,455 B1 * | 9/2001 | Kocher et al. | 713/194 |
| 6,370,584 B1 * | 4/2002 | Bestavros et al. | 709/238 |
| 6,427,174 B1 * | 7/2002 | Sitaraman et al. | 709/245 |
| 6,470,389 B1 * | 10/2002 | Chung et al. | 709/227 |
| 6,519,636 B2 | 2/2003 | Engel et al. | 709/223 |
| 6,553,028 B1 * | 4/2003 | Tang et al. | 370/389 |
| 6,671,724 B1 * | 12/2003 | Pandya et al. | 709/226 |
| 6,870,849 B1 * | 3/2005 | Callon et al. | 370/395.32 |
| 6,898,641 B1 * | 5/2005 | Kobayashi | 709/238 |
| 6,980,521 B1 * | 12/2005 | Jarvis | 370/238 |
| 6,980,550 B1 * | 12/2005 | Yip et al. | 370/392 |
| 6,985,956 B2 * | 1/2006 | Luke et al. | 709/229 |
| 2002/0023089 A1 * | 2/2002 | Woo | 707/101 |
| 2002/0026511 A1 * | 2/2002 | Garcia-Luna-Aceves et al. | 709/226 |
| 2002/0040389 A1 * | 4/2002 | Gerba et al. | 709/219 |
| 2003/0014503 A1 * | 1/2003 | Legout et al. | 709/219 |
| 2003/0039357 A1 * | 2/2003 | Alten | 380/46 |
| 2003/0051048 A1 * | 3/2003 | Watson et al. | 709/238 |
| 2003/0067923 A1 * | 4/2003 | Ju et al. | 370/395.3 |
| 2003/0169745 A1 * | 9/2003 | Gooch | 370/395.32 |
| 2003/0172278 A1 * | 9/2003 | Farnham et al. | 713/176 |
| 2003/0174710 A1 * | 9/2003 | Gooch | 370/395.32 |
| 2003/0210789 A1 * | 11/2003 | Farnham et al. | 380/270 |
| 2004/0064707 A1 * | 4/2004 | McCann et al. | 713/185 |
| 2004/0093525 A1 * | 5/2004 | Larnen | 713/201 |
| 2004/0098627 A1 * | 5/2004 | Larsen | 713/202 |
| 2004/0103096 A1 * | 5/2004 | Larsen | 707/9 |
| 2004/0128505 A1 * | 7/2004 | Larsen | 713/169 |
| 2004/0128510 A1 * | 7/2004 | Larsen | 713/171 |
| 2005/0005154 A1 * | 1/2005 | Danforth et al. | 713/200 |
| 2005/0044365 A1 * | 2/2005 | Haukka et al. | 713/171 |
| 2005/0044381 A1 * | 2/2005 | Larsen et al. | 713/182 |
| 2005/0050364 A1 * | 3/2005 | Feng | 713/201 |
| 2005/0138362 A1 * | 6/2005 | Kelly et al. | 713/156 |
| 2005/0283444 A1 * | 12/2005 | Ekberg | 705/67 |
| 2006/0064458 A1 * | 3/2006 | Gehrmann | 709/203 |
| 2006/0143453 A1 * | 6/2006 | Imamoto et al. | 713/169 |
| 2006/0161974 A1 * | 7/2006 | Innes et al. | 726/10 |
| 2006/0179312 A1 * | 8/2006 | Kelly et al. | 713/169 |
| 2006/0183489 A1 * | 8/2006 | Modeo | 455/466 |
| 2008/0084880 A1 * | 4/2008 | Dharwadkar | 370/392 |

FOREIGN PATENT DOCUMENTS

| | | |
|---|---|---|
| JP | 2002124996 | 4/2002 |
| WO | WO 01/71495 | 9/2001 |

OTHER PUBLICATIONS

Lewis. Request for Comments 3090: DNS Security Extension Clarification on Zone Status. Network Working Group. Mar. 2001. <http://www.rfcsearch.org/rfcview/RFC/3090.html>.*

Krawczyk, Bellare, and Canetti. Request for Comments 2104: HMAC: Keyed-Hashing for Message Authentication. Network Working Group. Feb. 1997. <http://www.ietf.org/rfc/rfc2104.txt>.*

Server Load Balancing in Today's Web-Enabled Enterprises. Foundry Networks. White Paper. Apr. 2002. http://www.foundrynet.com/pdf/wp-server-load-bal-web-enterprise.pdf.*

X. Nie, D. Wilson, J. Cornet, G. Damm, Y. Zhao, IP Address Lookup Using a Dynamic Hash Function, May 2005, Canadian Conference on Electrical and COmputer Engineering 2005, http://ieeexplore.ieee.org/stamp/stamp.jsp?arnumber=01557298.*

A. Menezes, P van Oorschot, and S. Vanstone, Handbook of Applied Cryptography, 1997, CRC Press, Revised Reprint, pp. 33-35, 321-331, 352-368.*

International Application No. PCT/US03/2088, Filing Date Jun. 24, 2003, International Search Report dated Oct. 22, 2003.

Jung et al., "Flash Crowds and Denial of Service Attacks: Characterization and Implications for CDNs and Web Sites", Proceedings of the Eleventh International World Wide Web Conference, (WWW2002) Honolulu, Hawaii, May 2002.

Yasushi Ichikawa, Shinji Yamane, Yuko Murayama, "The Examination of Contents Delivery Network (CDN)", The Institute of Electronics, Information and Communication Engineers, Technical Report of IEICE, NS2002-7 (Apr. 2002).

Canadian Office Action dated Jan. 8, 2009 in corresponding Canadian Appln. No. 2,493,350.

* cited by examiner

METHOD AND APPARATUS FOR IMPROVING THE RESILIENCE OF CONTENT DISTRIBUTION NETWORKS TO DISTRIBUTED DENIAL OF SERVICE ATTACKS

BACKGROUND OF THE INVENTION

1. Field of the Invention

The present invention relates generally to computer networks, and more particularly, to techniques for improving the resilience of content distribution networks to distributed denial of service attacks.

2. Background of the Invention

The problems of detecting and thwarting distributed denial of service (DDoS) attacks against Internet servers has recently drawn considerable interest, both from the networking research community and among new companies established primarily to combat these types of attacks. These attacks typically flood a network or server with bogus request packets, rendering it unavailable to handle legitimate requests. In a time where performance and availability are key differentiators among Internet services, such downtime results in substantial financial loss. Despite increased awareness about security issues, denial of service attacks continue to be an important problem. According to a recent Computer Security Institute survey, for example, the number of respondents indicating their site had been the victim of a DoS attack (e.g., TCP SYN flood) rose from 27% in 2000 to 38% in 2001.

Most of the work on countering DDoS attacks to date has focused on attacks that target a single centralized server location or Web site, where the attackers can overrun bandwidth and server resources with relative ease. In today's Internet architecture, however, many high-volume sites are distributed, either replicating content in several data centers, or distributing content using a content distribution service provider (CDSP). For example, among the top 20 most highly trafficked sites on the Internet as reported by Media Metrix, at least 15 use a CDSP such as Akamai, Digital Island, or Speedera. It is evident also, that high-volume sites are likely targets of DDoS attacks. In February 2000, for example, a spate of sophisticated DDoS attacks brought down several high-profile sites including Yahoo, Ebay, Amazon.com, CNN, and Buy.com, most of which currently employ a CDSP to distribute content.

In addition to promising better performance, CDSP's often claim that they can offer increased resilience to DDoS attacks. While content distribution networks (CDNs) do provide some protection from DDoS attacks by their inherently distributed nature, their shared server infrastructure can also be a weakness. An attack on a single CDN-hosted Web site can affect many (or all) of the customer sites hosted by the CDSP. Without a careful site allocation strategy, the redundancy and replication provided by the CDN offer limited protection for all the hosted customers.

SUMMARY OF THE INVENTION

According to various embodiments of the present invention, deterrence mechanisms to denial of service attacks suitable for a content distribution network (CDN) are provided. These include a hash-based request routing scheme and a site allocation scheme. The hash-based request routing scheme provides a way to distinguish legitimate requests from bogus requests. Using this mechanism, an attacker is required to generate $O(n^2)$ amount of traffic to victimize a CDN-hosted site when the site content is served from n CDN caches. Without these modifications, the attacker must generate only $O(n)$ traffic to bring down the site. The site allocation scheme provides sufficient isolation among CDN-hosted Web sites to prevent an attack on one Web site from making other sites unavailable. Using an allocation strategy based on binary codes, a guarantee can be provided that a successful attack on any individual Web site that disables its assigned servers, does not also bring down other Web sites hosted by the CDN.

In various embodiments of the present invention, a method is provided for improving the resilience of a content distribution network to distributed denial of service attacks. According to this method, a source address is received from a client, and the source address is then verified to ensure that it is accepted at the server. If it is accepted, then a higher level of service is provided to the client.

Verification that the source address belongs to the client may include employing a hash-based technique in which the source address and a site address are hashed to obtain a server id, and the server id is sent to the source address. When a server receives a client request, including a client source address and a requested site address, these values are hashed to obtain a second server id. A determination is then made as to whether this server id identifies the server.

Both client source address and destination site address are used to determine the acceptance of the client's request at the server when not all CDN servers host the entire customer sites. The present invention provides a method to convey the site information in the client's request along with the client source address. The requested site address may be determined at the server based on a destination address used by the client to contact the server.

Requests from clients that are provided with a higher level of service may be inserted into a normal queue and remaining requests from clients inserted into a low priority queue. The requests in the normal queue are given priority over requests in the low priority queue. The requests in the low priority queue may be dropped.

Additionally, multiple priority levels may be provided. In this case, requests from clients are inserted into the $i^{th}$ level of a multi-level priority queue, where i is the priority level of a client at the server.

Hashing functions used in the CDN may be keyed hashing functions using a secret key shared between routers and servers. These hashing functions may be periodically updated. During a predetermined time interval, both old and updated hashing functions may be honored, in verifying the source address.

According to various embodiments of the present invention, a method is also provided for allocating Web sites to servers in a content distribution network. Allocation vectors are provided for a plurality of Web sites, each of the allocation vectors including a binary vector for mapping allocation of servers to a web site. An optimal allocation of Web sites to servers is determined using specified resource constraints, and the allocation vectors are then configured to reflect the determined optimal allocation.

The results of coding theory may be used to determine optimal allocation vectors. For example, a plurality of n-bit binary vectors may be generated for a predetermined number of servers such that each n-bit binary vector has an equal Hamming weight and such that the pairwise Hamming distance between the n-bit binary vectors is a maximum value. If the number of servers is known, an optimal allocation for a given Hamming distance can be determined by generating a plurality of n-bit binary vectors for a predetermined number of servers, such that each n-bit binary vector has an equal Hamming weight and such that the pairwise Hamming distance between the n-bit binary vectors is a predetermined value.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention focuses on developing deterrence mechanisms that are suited for content distribution networks (CDNs). According to various embodiments of the present invention, a technique is provided that makes the job of an attacker significantly more difficult by leveraging features unique to CDNs, namely the request routing system which directs client requests to the most appropriate CDN server, and the policy of assigning Web site content to shared CDN servers. Various mechanisms are disclosed that improve the resilience of shared CDN content-serving infrastructure, and also provide sufficient isolation among CDN-hosted Web sites to prevent an attack on one Web site from making other sites unavailable.

The present invention provides significantly higher resilience against DDoS attacks and improves Web site availability, making it much more difficult for attackers to achieve their goals in a CDN environment. Furthermore, rather than trying to optimize the performance of the CDN while still offering some level of protection, focus is placed on site allocation schemes which guarantee that an attack on an individual Web site does not affect other CDN-hosted sites. The approach is to preserve this guarantee while also degrading performance as little as possible for the remaining sites.

Figure 1:
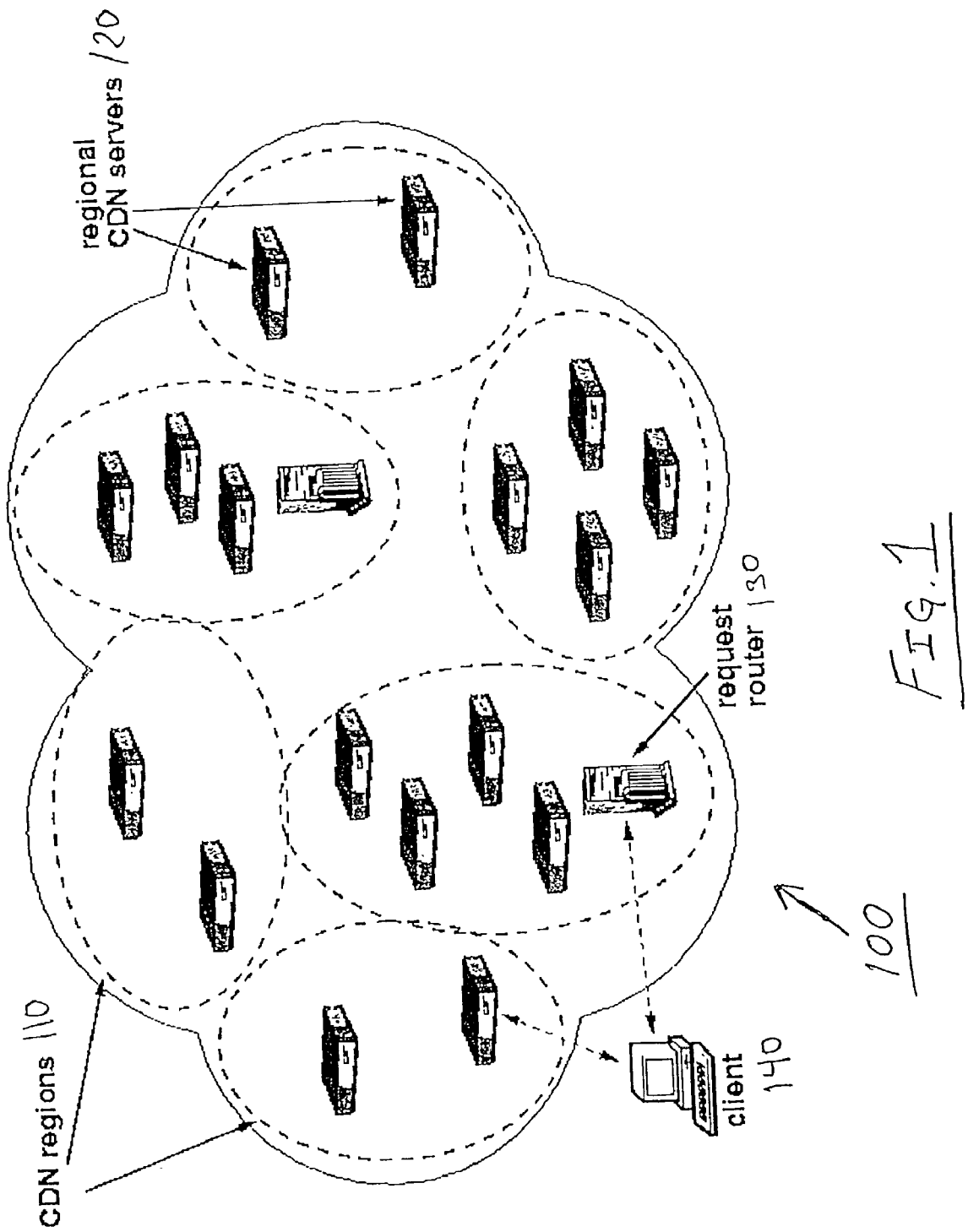
FIG. 1 illustrates an exemplary content distribution network.

Referring to FIG. 1, a content distribution network (CDN) 100 includes a plurality of CDN servers, such as CDN servers 120, distributed in multiple regions. As depicted in FIG. 1, CDN regions, such as CDN regions 110, include groups of CDN servers. Regions may be arbitrarily defined, though they typically have some topological or geographic significance. Servers deployed in a set of ISP networks or autonomous systems, for example, could be part of a single CDN region.

Each CDN server is shared in that it may serve content from multiple content providers (i.e., customers of the CDSP). There also may be an origin server which acts as the authoritative source of content for a particular content provider. The model is applicable to any Web-based content or applications that are replicated across many sites.

In operation, a client 140 accesses content from the CDN servers by first contacting a request router, such as a request router 130, which (transparently) directs the client 140 to an appropriate regional cache. The request router is logically separate from the caches though it could be physically co-located. The distribution of request routers usually depends on the CDN size. For example, they may be deployed in every region if the CDN has a very wide distribution. The request router may base its decision on the client IP address, perhaps along with other information about the state of the network or the candidate servers, or about the content being requested. In practice, the request router may be a DNS server or Web server which chooses a proximal cache when the client makes a name resolution request or client request, respectively. We do not consider how a client makes contact with the request router. Many CDN's, however, use the DNS for this purpose.

The present invention focuses on flooding-type attacks, where the attacker tries to swamp the victim site with a very large amount of network traffic, making the site effectively unavailable to service user requests.

To launch a large-scale DDoS attack, the attacker must first infiltrate and subvert a large number of geographically distributed machines connected to the network. The compromised machines are then used to generate attack traffic or as reflectors to hide the true origin of the attack. The process of compromising a host and installing the attack tool is often automated and can be done on a singe host in a few minutes. Since the compromised hosts can themselves be used to further scan and subvert other hosts, thousands of hosts can be compromised within an hour. If the attacking hosts are used to learn some information about the CDN hosting the target Web site (e.g., address of CDN servers), hosts can exchange this information during the course of the attack.

Often an attacker will spoof the source IP addresses in attack packets in order to hide the true origin of the attack and increase its effectiveness. Using genuine IP addresses reveals the source of the attack, allowing it to be traced back by existing schemes. Moreover, detecting a surge of packets from a set of IP addresses, and subsequently blocking that traffic, is quite feasible using stateful packet filtering. Initially, we assume that the attacker selects source IP addresses uniformly from the entire IP address space. We show later, however, that the effectiveness of our scheme is not diminished if the attacker tries to choose addresses more carefully.

Since the HTTP protocol uses TCP, flooding CDN servers is a special case of the TCP SYN flood attack. Numerous defensive measures against TCP SYN flood attacks have been proposed and deployed. Some countermeasures are deployed on potential targets of attack, such as randomly dropping TCP SYN packets, shortening the time period allowed for establishing TCP connections, increasing the length of the queues holding partially-established TCP connections, and increasing system memory size. Other approaches are deployed on network routers, such as rate-limiting and traffic-shaping. While all these countermeasures are effective in preventing overload at the attack target, they cannot differentiate between malicious TCP SYN packets and large numbers of legitimate TCP SYN packets triggered by sudden events. As will become apparent, the present invention not only prevents overloading, but also provides effective differentiation between malicious and legitimate requests destined for a CDN server.

To facilitate a better understanding of the present invention, we first consider a simple metric to quantify the relative resilience of a Web site. Intuitively, we say a site A is more resilient than a site B if the attacker needs to send more traffic to bring down the site A than is required to bring down the site B. Thus, we define the relative resilience of a site A in comparison with another site B as follows:

Resilience of a Server: Server A is k times more resilient than server B if k times more attack traffic is required to make server A unavailable than to make server B unavailable, where unavailability is defined identically for both servers A and B.

More precisely, when we view the CDN as a network of n servers that replicate the full content of the origin server, it is straightforward to show that CDN provides $O(n)$ resilience compared to a single server because it takes n times more attack traffic to bring down all n caches than is required to bring down a single server.

Our second metric quantifies the degree of isolation, or protection, of a site from an attack on another site hosted by the same CDN. For example, consider a CDN hosting two independent Web sites A and B. Ideally, a DDoS attack on the site A should not affect the performance or availability of the site B at all. This is true when the two sites don't share any common servers. But in practice, Web sites are hosted by shared servers in order to achieve good throughput performance out of the servers. Therefore, it is important to balance the performance requirement and the protection of the hosted Web sites. In particular, an important goal is to maximize the number of servers hosting each site while guaranteeing a level of isolation among them.

One way to quantify the level of isolation is to count the number of servers that are not shared by the sites of interest. More precisely, we can define the degree of isolation between any two sites as follows:

Degree of Isolation: Let $w_i$ and $w_j$ denote two independent Web sites, and $S_i=\{s_1, \ldots, s_j\}$ and $S_j=\{\hat{s}_1, \ldots, \hat{s}_k\}$ denote the sets of CDN servers allocated to $w_i$ and $w_j$, respectively. We define the degree of isolation between $w_i$ and $w_j$ to be min $(|S_i-S_j|, |S_j-S_i|)$.

As will be shown later, assuming that each site is assigned an equal number of servers, then the degree of isolation between two sites is simply $$\frac{d}{2}$$

where d denotes the number of disjoint caches.

We next present a novel algorithm, called hash-based request routing, that can significantly improve the resilience of the CDN against DDoS attacks using spoofed IP addresses. The main idea of the hash-based request routing is to treat the requests with legitimate source IP addresses differently from those with spoofed source IP addresses so that most of the attack packets are preferentially dropped while servicing legitimate requests when the CDN is overloaded. This goal is achieved by leveraging one of the features unique to CDNs, namely, the request routing systems. This hash-based request routing scheme blocks most of the attack traffic without inhibiting the legitimate requests at all. More precisely, when there are n servers serving a Web site, $$\frac{n-1}{n}$$

fraction of the attack traffic will be dropped by the server. In this way, we can ensure that server resources are mostly utilized to service legitimate requests even under attack thereby significantly improving the survivability of the CDN.

The hash-based request routing algorithm builds upon the fact that most CDNs employ request routing systems as a part of their service infrastructure: when a client wants to access a Web site hosted by a CDN, it first contacts a local request router to find the IP address of the CDN server to contact. In general, request routing systems try to optimize the response time perceived by clients or to balance the load at CDN servers. In our architecture, the hash-based request routing serves the purpose of differentiating legitimate requests from potential attack traffic with spoofed IP addresses. This goal is achieved by a simple keyed hashing using a secret key shared between routers and CDN servers.

Figure 2:
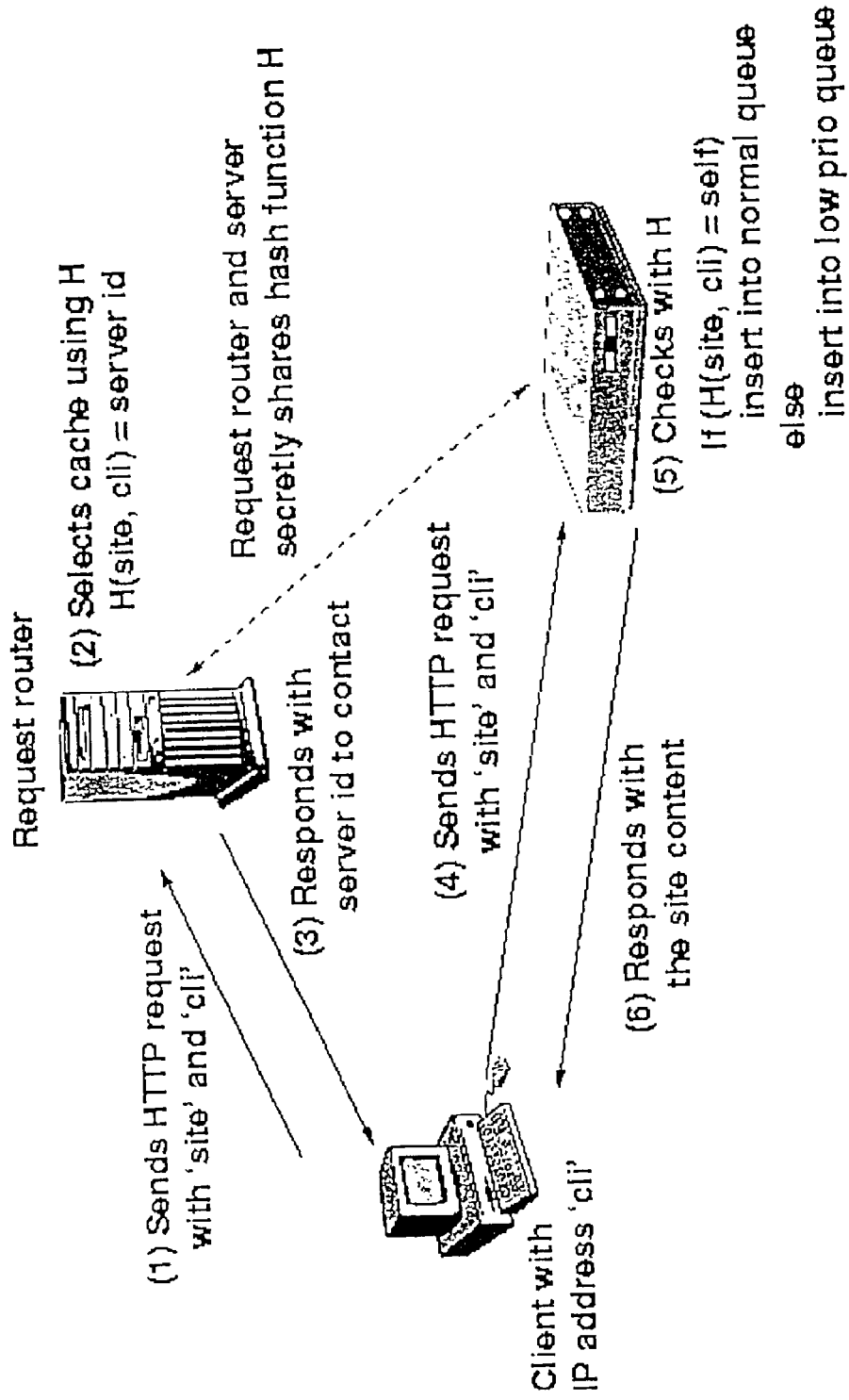
FIG. 2 depicts a hash-based request routing technique according to an embodiment of the present invention.

Referring to FIG. 2, the operation of the hash-based request algorithm is illustrated. When a client wants to access a Web site, it first sends a request to a local request router to discover the address of the CDN server to contact (step 1). The client can contact any request router in its region. Next, the request router selects a CDN server based on the Web site and the source IP address of the client using a hash function H, which is secretly shared with the CDN servers (step 2). A simple uniform hash function may be used. E.g., H: Web site×IP address→server address. In other words, any given (Web site, IP address) pair is equally likely to hash into any server address.

Next, the request router responds with the address of the CDN server to contact (step 3). Note that the attacker cannot use a spoofed address to discover the mapping between the IP address and server because the response will be sent back to the source address contained in the query. In other words, the attacker can discover the mappings for the IP addresses of the compromised hosts only, which are relatively small compared to the entire usable IP address space.

Upon reception of the response from the request router, the client sends a request to the server with server address (step 4). When the CDN server receives the request it checks to see if the (source address, Web site) pair in the request hashes to its own address using the shared hash function H.

If the hash value matches its own address, the server inserts the request into the "normal" service queue; otherwise, it inserts the request into the "low priority" service queue, which has only a small amount of buffer to absorb misdirected packets due to routing anomaly or any temporary inconsistency (step 5). The requests in the "normal" service queue always get served before the "low priority" service queue; only when the "normal" queue is empty, the "low priority" queue gets served.

Once the request is processed by the server, the requested object is returned to the client (step 6). Note that no legitimate request will be inserted to the "low priority" service queue in the common case assuming the consistency of H between the request router and the server is maintained.

Now, suppose that the attacker spoofs the source address by randomly selecting an IP address from the entire IP address space. From our assumption of a uniform hash function H, statistically only $$\frac{1}{n}$$

fraction of the total attack traffic will pass the test at the server and will be inserted in the normal service queue. The other $$\frac{n-1}{n}$$

fraction of the attack traffic will fail the test and will be put to the low priority queue. Since the low priority queue has only a limited amount of buffer to handle rare incidents such as misdirected packets, most of the attack traffic will be silently dropped. Therefore, valuable resources at the server will not be wasted by the attack traffic.

From the attacker's perspective, this means that it must generate more attack traffic to bring down a server. More precisely, it effectively takes O(n) times more attack traffic to bring down a single CDN server with the filtering based on our hash-based request routing mechanism than is required to bring down a server without one. Since there are n such servers collaborating in a region, in order to bring down all n servers simultaneously to make the site completely unavailable, the attacker needs to generate $O(n^2)$ times more attack traffic in total than is required for bringing down a site hosted by a single server. In other words, the hash-based request routing algorithm warrants $O(n^2)$ resilience to a CDN with n servers compared to a single-server site.

Recall that trying to swamp a site with a huge number of requests with genuine source IP address should be deemed ineffective to the attacker, since it reveals the sources of the attack. Moreover, a stateful packet filtering can effectively block the attack stream by detecting the surge in traffic from a set of IP addresses. Therefore, the attacker will have to spoof the source IP address when attacking a site. Recall that there are practically an infinite number of candidate hash functions and these functions are not based on any network-level information, e.g., the proximity of a server to certain IP addresses or the load level of each server. Therefore, it is practically impossible for the attacker to guess the mapping and intelligently spoof the IP addresses.

It is to be appreciated that the scheme described herein reacts differently to overload due to attack from the case of a mere surge in user interests. In the case of an attack, ideally the server should ignore the incoming requests without taking any action. On the other hand, in the case of overload, the server should try to service all user requests in the order of arrival at the cost of performance degradation, e.g., increase in response time. The present invention roughly follows the ideal behavior by dropping most of the attack packets allowing only a small fraction of the attack packets to be actually processed by the server; while in the case of overload, all the requests will be put to the normal queue and eventually will be serviced by the server in the order they have arrived.

For fault tolerance and load balancing purposes, request routers may respond with more than one server address to a client's request. As in DNS, when one of the servers cannot provide the expected service due to failure, the client can try to contact other servers to get the object. At the same time, by randomizing the primary server to contact in the response, we can reduce the chance of overloading a single server. However, this method adversely affects the effectiveness of the hash-based request routing mechanism since now a single IP address will pass the test at multiple servers. Therefore, the attack traffic with spoofed IP addresses have a higher chance to penetrate the hash-based filtering of the server.

More precisely, if a request router responds with {$server_1$, $server_2$, ..., $server_n$} to a query for Web site by a client x, the traffic originating from x must be accepted at all k servers in the list. Assuming that k randomly chosen servers are associated with each IP address, each server must accept k times as many addresses to be legitimate as before. In terms of DDoS attack, the hash-based filtering at the server now accepts the fraction $$\frac{k}{n}$$

of the attack traffic instead of the fraction of $$\frac{1}{n}$$

of the traffic. This effectively degenerates the resilience of the hash-based requests routing scheme into $$O\left(\frac{n^2}{k}\right)$$

from $O(n^2)$.

One way to work around this problem is to have a prioritized association of IP address to server id's, and have clients to contact the primary server first whenever possible. For example, assume for the address x, $server_1$ is the primary server, $server_2$ is the secondary, and so on. In this case, the client x must first contact $server_1$ to retrieve an object. Only when $server_1$ is not available the client may try $server_2$, and the other servers in the list in order. At the server, we make a different type of prioritized association of a set of addresses. We assume each server has a priority queue with k+1 levels, where level 1 is the highest priority. Let us define the priority class of a packet to be the rank of the server for the source address of the packet. When a server receives a packet coming from an address in the priority class i, it inserts the packet into the ith level in the priority queue. If a packet is from an out-of-profile address, then it is put to the lowest priority queue. In this way, the server processes the packets from the first-priority addresses with the highest priority, thereby optimizing the response time.

In practice, the value of k will be small, e.g., k=2 or 3, requiring only a small amount of added overhead for prioritized operation while providing necessary redundancy for practical purposes.

While in theory the attacker can only discover the mapping for the compromised hosts under its control, in practice, they may learn the mapping for the other IP addresses via various channels, e.g., by eavesdropping the responses coming out from the request router on network links. Although the attacker may not have resources or time to capture all the responses or to send probe packets, considering that this learning process can also be done parallel in a distributed manner, the attacker may discover a large portion of the mapping during the course of attack or even before launching a full scale attack. To address this problem, we can periodically update the shared hash function H after a certain interval invalidating the learned mappings by the attacker in the previous intervals.

In particular, the CDN service provider distributes a set of H's to request routers and servers a priori. With this "provisioning," the CDN servers and the request routers can independently update the hash function H during the course of attack. When updating the hash function H, there can be a time period of inconsistency of the hash function between request routers and servers. This problem can be easily handled by allowing a "handing off" period, during which time, both old and new mappings are honored. With this added level of protection, it becomes significantly harder for the attacker to discover the hash function H.

We now outline various strategies to allocate Web sites to different CDN servers with the aim of isolating the impact of an attack on any one site. Ideally, we want an allocation of sites to servers such that the response time and throughput of the site deteriorates as little as possible, even if other sites being served by the same CDN are under attack. The allocation strategy should address the following two, conflicting goals: (1) For each Web site, we want to have a large number of CDN servers to serve the site. (2) For any pair of Web sites, if one is the target of a DDoS then the other should experience as minimal a loss of service as possible.

The first goal maximizes the throughput of any site hosted by the CDN and the second goal isolates a Web site from attacks on any other site. Such an allocation strategy when combined with the request routing algorithm previously discussed substantially increases the effort required by an attacker trying to bring down a Web site or by attacking another Web site concurrently hosted by the CDN. Intuitively, allocating large fractions of the available caches to each of two different sites forces a large overlap in the servers hosting both the sites. Thus an attack which brings down the servers hosting one site also collaterally causes a large loss of service for the other site. Allocation strategies must therefore balance both requirements in assigning sites to servers.

The following terminology formally states the problem of server allocation strategies.

Let S be the set of CDN servers and W the set of Web sites which we allocate to the servers in S. For each site $w \in W$ form the binary vector of length $|S|$ with bit i set if w is allocated to server i. This $|S|$ length bit vector is called the allocation vector for the site.

Following standard terminology, the Hamming weight of a binary vector is defined to be the number of 1 s in the vector. Thus, the Hamming weight of the allocation vector of a site represents the number of CDN servers that serve content for this Web site. With this, the requirements above can be restated as follows.

(1) The allocation vector of each site has as large a Hamming weight as possible.

(2) For any two Web sites $w_1$ and $w_2$, the number of servers which serve $w_1$ but not $w_2$ (and vice versa) is as large as possible, i.e., if $s_1$ and $s_2$ are the allocation vectors $w_1$ and $w_2$ respectively, then the Hamming weight of the binary vectors $(s_1 \wedge (\overline{s_2}))$ and $(s_2 \wedge (\overline{s_1}))$ be as large as possible.

In the restricted case where all Web sites are treated equally, i.e., when the allocation vectors $s_1$ and $s_2$ have equal Hamming weight, then we have $$\text{Hamming weight } (s_1 \oplus s_2) = 2 \times \text{Hamming weight } (s_1 \wedge (\overline{s_2}))$$
$$= 2 \times \text{Hamming weight } (s_2 \wedge (\overline{s_1})).$$

The Hamming weight of the vector $(s_1 \oplus s_2)$ is called the Hamming distance between the vectors $s_1$ and $s_2$. Therefore in the restricted case, we want to find allocation vectors for the sites with large Hamming weight and the constraint that we have as large a Hamming distance between the vectors as possible. Given a fixed number of CDN servers, the allocation strategy must be flexible enough to accommodate as large a collection of Web sites as possible. Thus the problem of site allocation can be stated as follows:

Given n, the number of CDN servers, we want an efficient algorithm to enumerate a large number of binary vectors each of length n, such that each vector has Hamming weight exactly h each (as large as possible) and such that the pairwise Hamming distance d between vectors is as large as possible.

Such an algorithm can sequentially generate such n bit vectors and assign them as the allocation vectors for each Web site. The algorithm then guarantees that each Web site is served by h CDN servers out of a possible n. If the servers corresponding to a particular site are all rendered inoperative due to a denial of service attack then any other site is guaranteed to be served by at least $$\frac{d}{2}$$

servers. Thus under such an allocation, each Web site utilizes $$\frac{h}{n}$$

of the available capacity and the resulting loss of service when any one Web site is taken down is at most $$\left(1 - \frac{d}{2h}\right) \times 100 \text{ percent.}$$

From the requirements stated earlier, it would be desirable to have parameters h and d be as large as possible and enough vectors exist to cover all the Web sites. We next outline general allocation methods where we try to maximize h and d along with maximizing m, the total number Web sites which we can accommodate. Later, we consider other possibilities such as the case when we are given fixed values for m and we wish to optimize the other parameters h and d.

In the present invention, the allocation strategies are adaptations of results from coding theory which is the study of efficient algorithms to generate large numbers of binary vectors (not necessarily with the same Hamming weight) with a guaranteed Hamming distance between vectors. Formally, a code of length n and minimum distance d is a collection of binary vectors of length n such that the Hamming distance between any two vectors is at least d. Various algorithms are presented to convert codes into allocation vectors. Our discussion outlines general constructions without details of actual codes.

In general, defining codes with numerous vectors where all codewords have exactly a fixed Hamming weight, is a difficult problem in coding theory. The few codes that exist to generate constant Hamming weight codewords, called constant weight codes, generally yield only a small (usually polynomial in the length of the code) number of codewords. To accommodate a larger number of Web sites, we explore algorithms where we take arbitrary codes and prune them to yield binary vectors fitting our specification. Our first cut at an allocation strategy is the following naive algorithm.

Algorithm 1: Fix a code of length n with a large minimum distance d. Choose parameter h so that there are enough codewords of Hamming weight h. A simple strategy to enumerate allocation vectors is to generate all binary vectors with Hamming weight exactly h and output only those vectors which are codewords, i.e., belong to the code.

Note that in the description of the algorithm we have not fixed particular values for d or h. To do this we first fix a code from a family of codes which fixes the parameter d. Once we fix a code or a family of codes, this defines a distribution on the Hamming weight of the vectors in the codes. The parameter h is then chosen to have an allocation for at least m Web sites based on this distribution of Hamming weights.

Besides finding good values for the parameters h and d, we also wish to use codes which have explicit constructions and efficient algorithms to enumerate codewords. A particularly good class of codes which have easy algorithms to identify codewords are the class of linear codes. This includes a number of codes such as the Reed-Solomon codes which have a substantial number of applications in other areas.

We define a linear code to be a set of vectors of length n which forms a linear subspace, i.e., if $c_1$ and $c_2$ are codewords, then $c_1 \oplus c_2$ is a codeword. An (n, k, d) linear code is a linear code of length n with minimum distance d and the dimension of the linear subspace is k. Such a linear code is defined by a k×n binary matrix G called the generator matrix and the set of codewords is obtained by x×G where x ranges over all binary vectors of length k.

Recall some elementary facts about linear codes which we use in our discussion. First, note that linear codes produce codewords with arbitrary Hamming weight. The algorithm to generate words belonging to a linear code is straightforward: Sequentially enumerate vectors of length k and multiply by the generator matrix G. Alternatively, a linear code is also defined by its syndrome matrix C, an (n−k)×n binary matrix: an n length word x belongs to the code if and only if $x \times C^T = 0$. Using this, our next refinement to find allocation vectors is the following:

Algorithm 2: Fix an (n, d, k) linear code with a large minimum distance d. Then systematically generate all binary vectors of Hamming weight h and retain only those words x such that $x \times C^T = 0$. Alternatively, we can enumerate vectors y of length k and generate the codewords as y×G and retain only those with Hamming weight h.

Again, as before, the parameters d and h are chosen by first fixing a family of linear codes to define d. Once the code is fixed, h is chosen to maximize the number of codewords with Hamming weight h in this code.

Before we provide details on some actual codes and the parameters they yield, we describe another general scheme to obtain allocation vectors from codes. In this scheme, rather than choosing arbitrary values of h, we try to focus on a particularly good value for h. Note that if we choose too large a value for h, then there are few vectors of Hamming weight h and hence few codewords of Hamming weight h. Also, choosing too large a value for h implies that the maximum distance (which can be at most n−h) will be small. On the other hand, if we choose too small a value for h then each Web site is served by at most h CDN servers and thus results in wasted capacity. From this perspective, a particularly promising value for h is $$\frac{n}{2}.$$

This is the value for which there are the maximum number of binary vectors and hence potentially a large number of codewords. For this choice of h we can use the following technique, which is a little wasteful in terms of code length but produces words of exact Hamming weight.

Algorithm 3: Fix a code C of length n with minimum distance d. Define a modified Code C' such that for each codeword c∈C, C' contains the 2n length word $c' = \overline{cc}$.

In the modified code C', each codeword so generated has length 2n. Furthermore, each codeword in the modified code has weight exactly n (half the length of the code), and the minimum distance of words in C' is at least 2d. This is a quick way to use any code to produce words of constant Hamming weight with $$h = \frac{n}{2}.$$

If we choose good codes as candidates for C then this algorithm yields many allocation vectors as each codeword in C is then converted to an allocation vector.

These algorithms are general methods to convert codes into allocation strategies for Web sites to CDN servers. Plugging in good codes into the construction outlined above yields good allocation strategies. We also note that the equivalence holds in the other direction: any allocation strategy can be converted into a code. If we had a strategy to allocate each of m Web sites to h CDN servers out of n such that a Web site which is not under attack is guaranteed to have at least a fraction f of its CDN servers still operating, then the allocation vectors form an n length constant weight code (weight h) and a minimum distance 2fh, with at least m codewords. This equivalence is useful to study if allocation strategies with certain parameters are possible: There are a number of tables which list (for small values of n), given values for h and the distance d, the maximum number of codewords possible in such a code.

We now consider an example of how an allocation may be performed in practice using actual values for the different parameters. The example we consider is the case when we have 100 Web sites to be hosted by the CDN with the guarantee that at any time a Web site which is not under attack is served by 3 servers in the CDN. Restated, the problem is: given m=100 and the minimum distance d=6, we want to find optimal values for n and h.

The first step is to find the minimum value of n for which there is a code with distance d=6 and with at least m=100 codewords. Consulting a standard table, we would see that the minimum possible value for n is 15.

The first allocation strategy is to use a very specialized non-linear code which yields about 128 codewords with Hamming weight 8 with length n=16. This gives us a fairly optimal allocation strategy using an esoteric non-linear code.

Another allocation strategy can be obtained using the Reed-Solomon code in Algorithm 2. The particular Reed-Solomon code we use is of length n=21 with a distance of d=5 which yields 512 codewords. Inspecting the number of codewords of each Hamming weight we find the distribution of codewords is maximized at weights 10 and 11. We choose h=11 and choose only codewords of weight 11 which yields 126 codewords. For these constant weight words, the distance (which must be even) is actually 6 which matches the parameters we require.

A slightly less optimal allocation but one which is straightforward is to use Algorithm 3 choosing the code C to be the Hamming code of length 15 and distance 3. Hamming codes have extremely simple encoding algorithms and large number of codewords but with distance of only 3. For the parameters we have chosen, the Hamming code has 2048 codewords. Plugging this code into Algorithm 3 gives us an easily implementable allocation strategy where n=30 and each Web site is assigned to at least 15 CDN servers. While not optimal, the code yields a large number of codewords which gives us the flexibility to expand to more Web sites if needed.

We have chosen these codes to illustrate the tradeoffs in allocation. Optimal codes generally tend to be non-linear with complex encoding algorithms. Straightforward choices for codes, such as the Reed-Solomon code, give us slightly less optimal values of n. Once we have fixed a code and n, optimal values for h tend to be around $$\frac{n}{2}.$$

The codes used in the example are only a few of the many possible choices.

We next discuss a number of possible allocation strategies, which address different scenarios, i.e., for different classes of the parameters m, h, and d, and enumerate the guarantees they are able to provide. It should be appreciated that the cases presented herein are representative of a whole host of parameters and are in no way meant to be exhaustive. Table 1 summarizes the site allocation strategies using codes presented herein.

TABLE 1

| Code | Properties | Comments |
| --- | --- | --- |
| Hadamard Code | $m = 2n - 2, h = \frac{n}{2}, d = \frac{n}{2}$ | good isolation, small number of sites |
| Reed-Solomon Code | $m = O(2^{c_1 n}), h = \frac{n}{2}, d = \frac{n}{c_2 \log n}$ | balances isolation and number of sites, efficient construction |
| Justesen Code | $m = O(2^{c_1 n}), h = \frac{n}{2}, d = n - c_2$ | good isolation, many sites, higher complexity |

The first case we consider is when m, the number of Web sites, is small in comparison to n, the number of CDN servers. For cases when m is smaller than (2n−2) we can use subsets of Hadamard Codes and get very good guarantees on the resilience of the CDN servers. The Hadamard Code is a $$\left(n, \log(2n), \frac{n}{2}\right)$$

linear code and contains 2n codewords. One can recursively construct an Hadamard matrix when n is a power of 2 such that all but one row have exactly $$\frac{n}{2}$$

ones. Thus with this construction, we can construct 2n−2 binary vectors each with a Hamming weight of $$\frac{n}{2}$$

such that the minimum pairwise distance is $$\frac{n}{2}.$$

Using this as the set of allocation vectors we can assign each site to $$\frac{n}{2}$$

servers with the guarantee that a site will be served by at least $$\frac{n}{4}$$

servers at all times even if all the servers hosting another Web site become unavailable due to a DDoS attack. Thus, this allocation guarantees that a Web site will have no more than a 50% loss of service. For small values of m we can therefore get very good guarantees on the resilience of the CDN.

Besides optimization of the parameters, we wish to have efficient constructions of allocation vectors. A very general good class of codes with a large minimum distance and efficient algorithms for generating codewords are the Reed-Solomon codes. They typically yield best parameters for large alphabets but here we only focus on the binary versions of these codes. Reed-Solomon codes are linear codes with the following parameters: For any integers q, r and s, such that $s \leq r \leq q$ there is an $(r\lceil \log_2(q) \rceil, s\lceil \log_2(q) \rceil, r-s+1)$ Reed-Solomon code. Choosing parameters carefully, and using the technique of Algorithm 3 stated above, given n, we can use Reed-Solomon codes to enumerate an exponential number ($2^{c_1 n}$) of codewords with a minimum distance which is at least $$\frac{n}{c_2 \log(n)},$$

where $c_1$ and $c_2$ are constants. Thus, we can guarantee that no Web site will suffer more than a log(n) factor drop in service even when other Web sites are under attack rendering the CDN servers they are hosted on inoperative. While the log(n) factor drop in service guarantee is high, the allocation algorithms so obtained are easily implementable.

Like the Hadamard codes, which yield good allocation strategies for the case of a small number of Web sites, there are a number of other codes which can be converted to good allocation strategies. Care should be taken, however, while using more advanced coding methods since, typically, the more advanced coding techniques have complex algorithms for encoding and the best parameters can be obtained for large values of n. One such family of codes which yields good parameters are Justesen codes. Plugging in these codes in Algorithm 3 stated above gives us an allocation algorithm which yields an exponential number of allocation vectors where each Web site is allocated to CDN servers where we can guarantee that a Web site which is not under attack will at most suffer only a (small) constant factor loss of service even if another Web site is under attack.

So far we have enumerated allocation strategies based on a few example codes which yield good results for different ranges of parameters. In practice, the actual code which is chosen depends entirely on the actual values of the parameters n, m and the desired values for h and d. The first step to finding codes to convert to allocation vectors is to investigate the feasibility. For example, given a particular value for n, tables can be accessed on upper bounds for the number of codewords for various values of d using standard tables which list these bounds for small values of n. This directly gives the maximum number of Web sites which can be allocated for different values of d. Similarly, for larger values of n, one could use general upper bounds on the distance of any code to eliminate certain values of d given n and m. Note that just because a particular choice of values is not ruled out by these bounds does not imply that one can find a code for the given parameters.

So far we have considered only the case when there is a single class of service, i.e., all Web sites are treated equally. The direct relation between the resilience of allocations to distances of codes is possible only when the Hamming weights of the allocation vectors is the same. In practice, while building a CDN, we may need multiple levels of service to offer differentiated levels of service.

To handle k level of service the allocation problem becomes one of finding k sets of binary vectors $S_1, \ldots, S_k$ where each set contains vectors of the same Hamming weight such that for any two vectors u and v belonging to arbitrary sets, we require the Hamming weights of the vectors $u \wedge \bar{v}$ and $v \wedge \bar{u}$ are as large as possible. Although the requirement is the same as before, the equation Hamming weight $(u \oplus v) = 2 \times$ Hamming weight $(u \wedge \bar{v}) = 2 \times$ Hamming weight $(v \wedge \bar{u})$ is no longer valid. In other words, resilience is no longer directly related to distance. Thus allocation algorithms can no longer directly use constructions of codes. As we sketch very briefly, we can still find allocations for multiple classes of service using codes. First, we have to tweak the codewords such that the Hamming distance of codes yield guarantees on the isolation property that we want. There are several possible methods to achieve this and here we outline very elementary schemes.

The first elementary method to tweak codewords to obtain good isolation is as follows: divide an n length codeword into blocks of 2 bits and encode each 2 bit block into a 5 bit block by using the remaining three bits to record the Hamming weight of the two bit block (0, 1, or 2) by a 1 in the 3rd, 4th, or 5th bit, respectively. With this tweak, if two 2-bit blocks x and y have a non-zero Hamming distance, then both the vectors $x' \wedge \bar{y'}$ and $y' \wedge \bar{x'}$ have a Hamming weight of at least 1, where x' and y' are the tweaked versions of x and y. Thus, if two n bit vectors u and v have a Hamming distance of at least d, their tweaked version u' and v' have an isolation of at least $$\frac{d}{2}.$$

The tweaked versions have length $$\frac{5n}{2}.$$

This is a very elementary scheme which translates distance d codewords into binary vectors with at least $$\frac{d}{2}$$

isolation. However, the blowup is fairly big and the code length goes up significantly. There are a number of other schemes which similarly convert codes into resilient allocations by expanding the length of the codes. For example, by doubling the length of a distance d Reed-Solomon code and using small tweaks we can get binary vectors which offer a isolation guarantee of d.

Using such schemes which tweak codewords to get vectors which offer good guarantees on the isolation we can define allocation strategies similar to the algorithms for the restricted case. The methodology is similar: Choose a code C with good distance and tweak to obtain binary vectors with good isolation. Choose values of weights $h_1, \ldots, h_k$ such that there are enough words in the tweaked code with these Hamming weights. The different sets of codewords with weights $h_1, \ldots, h_k$ define the allocation vectors for the different levels of service. As before, the actual choice of weights depends on the choice of the code. The number of service levels, i.e., the value of k, and the amount of differentiation required in the different levels of service impose additional constraints on the choices of Hamming weights. However, the general strategy of first choosing a good code and converting the codewords into allocation vectors works equally well in this setting.

The hash-based request routing algorithm, as described above, differentiates bogus packets from legitimate packets based on a hash function that uniquely maps client IP addresses to CDN servers in the region. With the introduction of the site allocation algorithm, however, the request routing algorithm must map a client to a CDN server identifier based on the client address and also the Web site it wishes to access. This can be accomplished by introducing a hash function for each customer Web site. The effectiveness of hash-based request routing may be degraded, though, if a CDN server does not know which hash function to apply when it receives a packet that does not indicate the site being requested (e.g., a TCP SYN packet).

We can address this problem if we can force the client to inform the CDN server which site is being requested when sending the first SYN to establish a connection. One simple way is to encode the site information in the IP address returned by the request router. Specifically, the request router responds with an address whose network portion contains the true network address of the CDN server, but the host portion contains an encoding of (site, server id).

For example, if the CDN server to contact for site A is 192.19.1.13, the request router may respond with 192.19.212.9, where the network address, 192.19.0.0/16, is the same but the host portion of the address, 212.9, is encoded information about the site A and the server id. When the client sends an initial SYN packet, the packet will by routed to the 192.19.0.0/16 subnet where the CDN server cluster resides.

At the entry point, the packet is switched to the correct server using a switch (e.g., a fast NAT box or layer-4 switch), which typically performs load balancing across the CDN servers. In this scheme, the switch forwards the packet to the CDN server based on the (site, server id) encoding, and the server can compute the hash function to decide if the packet is legitimate. Alternatively, the CDSP may co-locate the hashing functionality at the switch to filter out bogus packets earlier. This scheme is appealing in that it is transparent to the client, but it is applicable to CDSPs who deploy a few clusters of servers in each region.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for improving the resilience of a content distribution network (CDN) to distributed denial of service (DDoS) attacks, comprising:
    sending, from a client to a router, a request to access a web site that is hosted by at least one of a plurality of servers in the CDN, the request including a source address of the client and a site address of the web site;
    hashing, at the router, the source address and the site address with a hash function that is shared between the router and the servers to obtain an address of one of the servers that hosts the web site;
    sending, from the router to the client, the address of one of the servers that hosts the web site;
    sending, from the client to the server with the address, a request for content of the web site, the request including the source address and the site address;
    hashing, at the server, the source address and the site address with the shared hash function to obtain a hash value, wherein the request is inserted into a normal queue in response to the hash value matching the address of the server, and the request is inserted into a low priority queue in response to the hash value not matching the address of the server; and
    sending, from the server to the client, the requested content in response to the request being inserted into the normal queue.

2. The method of claim 1, wherein the requested content in the low priority queue is sent from the server to the client in response to the normal queue being empty.

3. The method of claim 1, wherein further incoming requests are dropped in response to the low priority queue being full.

4. The method of claim 1, wherein the request, which is inserted into the normal queue, is inserted into an $i^{th}$ level of a multi-level priority queue, wherein i is a priority level of the client at the server.

5. The method of claim 1, wherein the hash function is periodically updated.

6. The method of claim 5, wherein during a predetermined period of time both old and new hash functions are honored.

7. The method of claim 1, wherein the router and the server are two separate devices found in two separate locations.

8. A program storage device readable by a machine, tangibly embodying a program of instructions executable on the machine to perform a method for improving the resilience of a content distribution network (CDN) to distributed denial of service (DDoS) attacks, the method comprising:
    sending, from a client to a router, a request to access a web site that is hosted by at least one of a plurality of servers in the CDN, the request including a source address of the client and a site address of the web site;
    hashing, at the router, the source address and the site address with a hash function that is shared between the router and the servers to obtain an address of one of the servers that hosts the web site;
    sending, from the router to the client, the address of one of the servers that hosts the web site;
    sending, from the client to the server with the address, a request for content of the web site, the request including the source address and the site address;
    hashing, at the server, the source address and the site address with the shared hash function to obtain a hash value, wherein the request is inserted into a normal queue in response to the hash value matching the address of the server, and the request is inserted into a low priority queue in response to the hash value not matching the address of the server; and
    sending, from the server to the client, the requested content in response to the request being inserted into the normal queue.

9. A method for distinguishing legitimate requests from attack requests to increase the amount of attack traffic necessary to bring down a content distribution network (CDN) server, comprising:
    sending, from a client to a request router, a hypertext transfer protocol (HTTP) request to discover an address of a CDN server to contact, the request including a source address of the client and a site address of a web site that the client wants to access;
    selecting, at the request router, a CDN server by hashing the site address and the source address with a hash function that is shared between the request router and CDN servers into a server address;
    sending, from the request router to the client, the address of the CDN server to contact;
    sending, from the client an HTTP request to the CDN server with the address;
    hashing, at the CDN server, the source address and the site address in the received HTTP request with the shared hash function to obtain a hash value, wherein the HTTP request is determined to be a legitimate request in response to the hash value matching the address of the CDN server, and the HTTP request is determined to be an attack request in response to the hash value not matching the address of the CDN server; and
    sending, from the server to the client, the web site in response to the HTTP request being legitimate.

10. The method of claim 9, wherein the legitimate requests are inserted into a normal queue and the attack requests are inserted into a low priority queue.

11. The method of claim 10, wherein the legitimate requests in the normal queue get served before the attack requests in the low priority queue.

12. The method of claim 11, wherein the low priority queue includes a small amount of buffer that rapidly fills when the CDN server is flooded with attack requests so that subsequent attack requests are dropped.

13. The method of claim 12, wherein the legitimate requests in the normal queue continue to get served by the CDN server when the CDN server is flooded with attack requests.

* * * * *